Nov. 26, 1935. G. A. LYON 2,022,128
ORNAMENTAL MEMBER FOR WHEELS
Filed Aug. 19, 1933
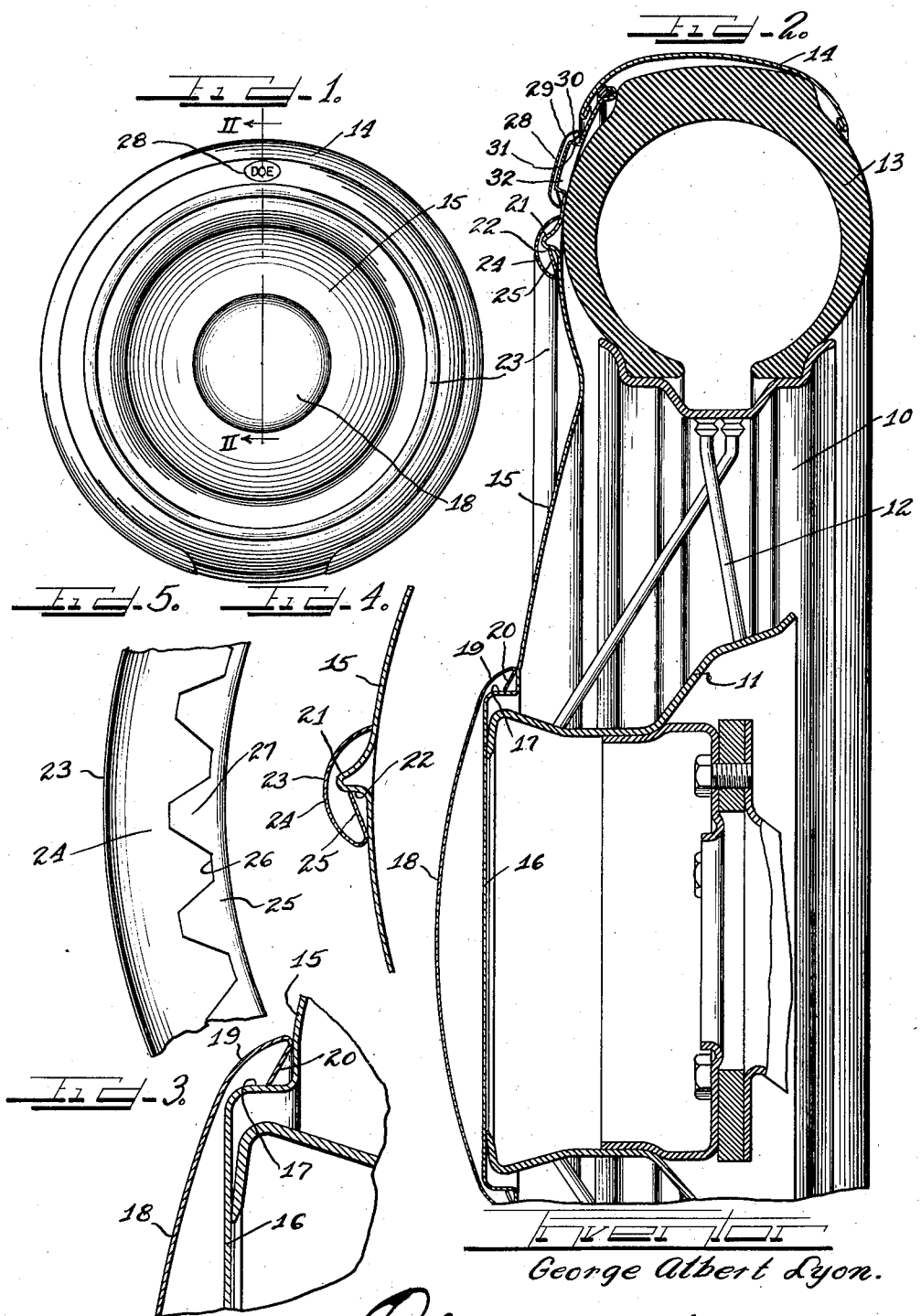
Inventor
George Albert Lyon.
by Charles H. Niell Attys.

Patented Nov. 26, 1935

2,022,128

UNITED STATES PATENT OFFICE 2,022,128

ORNAMENTAL MEMBER FOR WHEELS

George Albert Lyon, Detroit, Mich., assignor to Lyon Incorporated, Detroit, Mich., a corporation of Delaware Application August 19, 1933, Serial No. 685,838

9 Claims. (Cl. 41—10)

This invention relates in general to ornamenting means for wheels and is particularly concerned with the provision of ornamenting parts adapted to be cooperatively associated with a tire closure or cover to enhance the appearance of the wheel when it is being used as a spare.

In my Patent No. 1,807,697, dated June 2, 1931, there is disclosed a spare tire cover comprising a side part or plate adapted to extend over and be applied to the side of a wheel and its associated tire and a ring section which is adapted to be applied peripherally of the tire, one side of the ring section extending over the peripheral margin of the side section for the purpose of holding the side section in effective positon. This patent also discloses, at the central portion of the side section or plate, ornamenting means such as the name of the car.

It has been the practice for the cover manufacturer to ship the side section or plate of the tire covers described in the above mentioned patent to the automobile manufacturer in an unfinished condition. The automobile manufacturer then applied a finish to the side section or plate corresponding to the finish of the car with which the cover was to be furnished. Such procedure was not conducive to the furnishing of plated ornamental portions in the side section or plate, since these sections would have to be protected from damage during shipment and, moreover, would be subject to further damage or injury of the finish during the painting operation.

With the foregoing in mind it is an object of this invention to provide, in connection with a tire cover such as that disclosed in the above mentioned patent, ornamental means cooperative with the tire cover for enchancing the appearance of a wheel to which the cover may be applied.

It is a further object to provide, in an ornamenting member for wheels including a tire cover of the type which extends over the wheel parts and the tire thereon, a separately formed ornamenting bead for the tire cover portion of the cover and a separately formed ornamental cap for the portion of the cover which extends over the wheel hub.

It is a further object of the invention to provide, in connection with a cover for an automobile wheel and associated tire having annular offset portions at the hub and tire covering portions thereof, ornamenting means of such construction that it may be snapped into cooperative engagement with the offset portions of the cover and be retained in a fixed position solely by reason of its engagement with the cover.

It is also an object of the present invention to provide in connection with ornamenting means for wheels, an improved ornamental emblem disc.

Other objects of the invention will more fully appear from the following detailed description taken in connection with the accompanying drawing which illustrates a single embodiment thereof, and in which Figure 1 is a view in elevation of an automobile wheel embodying the features of this invention;

Figure 2 is an enlarged partial fragmentary diametral section through the wheel shown in Figure 1, showing the operative relationship of the wheel ornamental part taken substantially on line II—II of Figure 1;

Figure 3 is a still further enlarged fragmentary sectional view showing the cooperative relationship of the ornamenting means at the hub portion of the wheel;

Figure 4 is a similar view showing the cooperative relationship of the ornamenting means associated with and contiguous to the tire mounted on the automobile wheel;

Figure 5 is an enlarged fragmentary rear view of a portion of the ornamenting bead utilized contiguous the tire mounted on the completely assembled wheel.

In Figure 1 of the drawing there is illustrated an automobile wheel embodying the features of this invention, and while the same is illustrated in connection with a wheel having wire spokes, it will be apparent to those skilled in the art that the invention may be utilized with equal facility in connection with other types of wheels.

The wheel disclosed in the drawing comprises a rim 10 and a centrally disposed hub casing 11 which are interconnected in the usual manner by a plurality of spokes 12. Mounted on the rim 10 of the wheel is a tire 13 of ordinary construction.

The ornamental means for the wheel include a split band rim or tread covering part 14 and a side plate or part 15 which are mounted on the wheel and cooperate with each other in the same manner as the corresponding parts of the tire cover disclosed in my Patent No. 1,807,697, dated June 2, 1931. In the present case, however, the side plates or parts have been slightly modified for utilization in connection with the present invention.

The central or hub covering portion of the plate 15 is provided with an offset portion 16 which extends over one end of the hub casing 11 and defines a curved shoulder 17.

For ornamenting this portion of the wheel, there is provided an outwardly disposed ornamental cap 18 having an arched peripheral portion 19 which is turned back upon itself to form an inwardly projecting portion 20 for engaging the shoulder 17 to secure the cap 18 in cooperative position with the plate 15 in a manner which will be subsequently described in detail.

At the outer portion of the plate 15, which is contiguous the tire 13, the plate is provided with an offset portion 21 defining an annular flange or shoulder 22.

For ornamenting the portion of the plate 15 just described, there is provided an annular bead, generally indicated at 23, comprising a transversely arched body portion 24 which is turned back on its inner margin to form an inwardly projecting portion 25 which engages the shoulder 22 to secure the bead in cooperative engagement with this portion of the plate 15 in a manner to be subsequently described in detail.

Since the portions 20 and 25 of the cap and bead operate in the same manner with respect to the associated shoulders 17 and 22, it is thought that the invention will be clearly understood by describing this action in connection with the bead 23.

The portions 20 and 25 are constructed in the same manner. Referring to Figure 5, the turned back portion 25 is provided with cutout portions 26 so as to form a plurality of circumferentially spaced projections or teeth 27, the ends of which will engage the shoulder 22 in the case of the bead and the shoulder 17 in the case of the cap. It will be observed, that these teeth are inclined relative to the respective shoulders of the plate 15 associated therewith.

The cap 18 and the bead 23 may be made of any suitable material having resilient characteristics. For this purpose it is preferred to construct these parts of a material such as stainless steel so that the teeth 27 of either the bead or cap may be deflected by reason of mounting the parts in cooperative position with the plate 15. In constructing the bead 23, the diameter of the free end of the teeth should be normally slightly greater than the diameter of the surface engaged by the end of the teeth, whereas in the case of the cap 18 the diameter of the ends of the teeth should be slightly less than the diameter of the surface engaged by the ends of the teeth.

If desired, the bead 23 and the cap 18 may be ornamentally finished as by polishing or chromium plating, and if desired, the cap 18 may, in addition, carry other ornamental indicia such as the make of car.

In addition to the ornamenting cap and bead, which have been described above, for enhancing the appearance of the wheel, there is also provided a novel emblem disc 28. This disc obviously may be mounted at any desired location on the wheel cover, but for convenience has been illustrated as being disposed between the ornamental bead 23 and the peripheral edge of the plate 15 and preferably at point where it will be substantially at the uppermost portion of the wheel when the cover is mounted thereon.

The emblem disc construction is essentially the same as that of the cap 18 and comprises an arched peripheral portion 29 which is turned back upon itself to form an inwardly projecting portion 30 for engaging a shoulder surface 31 defined by an offset portion 32 in the plate 15.

From the foregoing it will be clear that the ornamenting cap 18, bead 23, and emblem disc 28 may be applied to the plate 15 after the plate has been finished to correspond to the color of car upon which the same will be installed. Thus, the ornamenting members are not subjected to the possibility of injury during the plating operation, and the plate may be finished without interference from these ornamenting members. In order to install any one of the ornamenting members, the operation is the same. It is axially pressed over the offset portion of the plate 15. This action causes the offset portion of the plate to deflect the teeth on the ornamenting member and cause them, by reason of their resilient nature, to forcibly engage the associated shoulder of the plate 15. The teeth will therefore be caused to bite into the surface of the shoulder and tightly secure the ornamental member in cooperative position with the plate 15.

It will be noted that when the ornamenting members are installed in their cooperative positions with the plate 15, the arched portion 24 in the case of the bead 23, the arched portion 19 and dished body of the cap 18, and the arched portion 29 of the emblem disc, function to conceal the associated offset portions of the plate 15 and the teeth cooperating therewith to hold the respective ornamenting members secured in position.

Now, it is of course to be understood that, although I have described in detail the preferred embodiment of my invention, the invention is not to be thus limited but only insofar as defined by the scope and spirit of the appended claims.

I claim as my invention:

1. In an ornamental disc adapted for use as a component part in a tire cover, a circular central projection on the disc adapted to form a hub cap closure and a cap snapped over said projection and having its outer margin provided with underturned teeth for biting into said projection, said teeth constituting the sole means for retaining the cap on the projection.

2. In a tire cover disc, a laterally projecting circular part disposed centrally of the disc, a cap shaped to simulate a wheel hub cap snapped over said part and including a circular row of underturned teeth for biting into said part, said teeth constituting the sole means for retaining the cap on said part.

3. In a tire cover disc, a laterally projecting circular part disposed centrally of the disc, a cap shaped to simulate a wheel hub cap snapped over said part and including a circular row of underturned teeth for biting into said part, said teeth constituting the sole means for retaining the cap on said part, and each being resilient and at such an angle that any tendency to dislodge the cap from the part only tends to augment the biting engagement between each of the teeth and the free surface of the part engaged by the teeth.

4. In a tire cover disc, a laterally projecting circular part disposed centrally of the disc, a cap shaped to simulate a wheel hub cap snapped over said part and including a circular row of underturned teeth for biting into said part, said teeth constituting the sole means for retaining the cap on said part, and said teeth being normally of a diameter slightly less than the outermost diameter of the part over which said teeth are snapped so that said teeth must be deflected as they are snapped over the part whereby the teeth are thereafter resiliently forced into biting engagement with said part.

5. In a tire covering assembly, an ornamental disc for covering the side portion of a tire and wheel, a plurality of lateral projections of circular configuration on the outer side of said disc, and a substantially circular ornamental member pressed over each of said projections, said members each having an underturned margin tightly engaging the respective projection to retain the member in position.

6. In combination, a vehicle wheel and tire, an ornamental disc shaped to overlie the side of said wheel and tire, said disc having a plurality of outstanding projections on its outer face, one of said projections being adjacent the hub of said wheel, and ornamental members snapped over said projections, each of said members having an underturned margin bitingly engaging an exterior portion of a projection, the other portion of each of said members concealing such engagement.

7. In an ornamental disk for disposition over an outer side of a wheel, a cup shaped outwardly projecting lateral part at the center of the disk, and an ornamental member snapped over the outer edge of said part so as to be self retained on said part.

8. In an ornamental disk for disposition over an outer side of a wheel, a cup shaped outwardly projecting lateral part at the center of the disk, and an ornamental member snapped over the outer edge of said part so as to be self retained on said part, said member having underturned fingers for retaining cooperation with said lateral part.

9. In an ornamental disk for disposition over an outer side of a wheel, an outwardly projecting lateral circular rib adjacent the outer periphery of the disk, and a ring-like ornamental bead snapped over said rib, said rib being of such cross-sectional form and said bead having concealed resilient means of such arrangement with respect to said rib that said bead is self retained on said rib.

GEORGE ALBERT LYON.